(12) United States Patent
Lee et al.

(10) Patent No.: US 7,014,494 B1
(45) Date of Patent: Mar. 21, 2006

(54) BATTERY CONNECTING APPARATUS WITH FAST ASSEMBLING MECHANISM

(75) Inventors: Shih-An Lee, Tu-Cheng (TW); Kai-Hsiang Chang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/227,499

(22) Filed: Sep. 15, 2005

(51) Int. Cl.
  *H01R 13/64* (2006.01)
(52) U.S. Cl. ..................... 439/374; 439/500; 439/929
(58) Field of Classification Search ................ 439/374, 439/429, 500, 542, 544, 545, 549, 553, 626, 439/929; 174/135
See application file for complete search history.

(56) References Cited

U.S. PATENT DOCUMENTS

| | | | | |
|---|---|---|---|---|
| 3,078,433 A | * | 2/1963 | Sheesley | .................... 439/278 |
| 3,456,231 A | * | 7/1969 | Zimmerman, Jr. et al. | . 439/532 |
| 4,578,628 A | * | 3/1986 | Siwiak | ........................ 320/127 |
| 5,505,635 A | * | 4/1996 | Willows et al. | ............. 439/500 |
| 6,142,813 A | * | 11/2000 | Cummings et al. | ......... 439/374 |

* cited by examiner

Primary Examiner—James R. Harvey

(57) ABSTRACT

A battery connecting apparatus includes a housing, a base and a connector. The housing has a receiving cavity with an opening at an end thereof for receiving a battery therein. The base for sealing the opening of the housing has an assembling hole defined therein. The connector is mounted on the base with a lower portion thereof extending below the base through the assembling hole and an upper portion thereof supported by the base. A sliding engagement mechanism is provided between the base and the connector for enabling the connector to slide between a removable position where the connector is removable from the base and an assembled position where the connector is assembled with the base. A latching mechanism is provided between the base and the insulating body for latching the connector in the assembled position.

4 Claims, 9 Drawing Sheets

BATTERY CONNECTING APPARATUS WITH FAST ASSEMBLING MECHANISM

BACKGROUND OF THE INVENTION

1. Field of the Invention

The present invention relates to a battery connecting apparatus, and more particularly, to a battery connecting apparatus having fast-assembling mechanisms used in a notebook computer.

2. The Related Art

Now, with information technology and the computer industry being highly developed, people more and more rely on computer system. Furthermore, with the functions and performance of the notebook computer approaching those of the desktop computer, the notebook computer that is compact and portable is more and more popular in the market.

As we know, the notebook computer as a portable device is mostly powered by a battery, so the notebook computer must be equipped with a battery. The battery is installed in inside space of the notebook computer by a battery connecting apparatus. The battery connecting apparatus commonly includes a battery housing, a base and a battery connector. The battery housing is used for receiving the battery therein. The base seals the housing. The battery connector is assembled with the base for electrically connecting the battery to a power supply circuit of the notebook computer.

In the past, it typically utilizes an additional part, such as a screw, to assemble the battery connector and the base together. The use of the additional part, however, increases the amount and the sorts of parts of the battery connecting apparatus, accordingly making it cumbersome to manage material. Therefore, the material overhead and the manufacturing expenses are increased. In addition, the assembling operation is discommodious by the use of the additional part.

There is a need to provide a battery connecting apparatus itself having fast assembling mechanisms for simplifying the assembling procedure.

A need also exists for a battery connecting apparatus that is composed of minimum parts.

SUMMARY OF THE INVENTION

Accordingly, an object of the present invention is to provide a battery connecting apparatus which includes a housing, a base and a connector. The housing has a receiving cavity with an opening at an end thereof for receiving the battery therein. The base is shaped for sealing the opening of the housing, which has an assembling hole defined therein. The connector includes an insulating body and a plurality of contacts disposed in the insulating body. The connector is mounted on the base with a lower portion thereof extending below the base through the assembling hole and an upper portion thereof supported by the base. A sliding engagement mechanism is provided between the base and the insulating body for enabling the connector to slide between a removable position where the connector is removable from the base and an assembled position where the connector is assembled with the base. The sliding engagement mechanism includes a sliding groove and a sliding rail being slidable along the sliding groove. A latching mechanism is provided between the base and the insulating body for latching the connector in the assembled position. The base together with the connector assembled thereon is inserted in the receiving cavity and seals the opening of the housing with the upper portion of the connector received in the receiving cavity for electrically connecting the battery and the lower portion of the connector remaining at outside for connecting the notebook computer.

In the present invention, with providing these sliding engagement mechanism and latching mechanism between the base and the connector, the assembling procedure of the battery connecting apparatus can be certainty and effectively simplified.

The connector and the base are connected together by the sliding engagement mechanism and the latching mechanism disposed on themselves. No additional part is needed. Parts of the battery connecting apparatus are thus minimized.

These and other features, objects and advantages of the present invention will be more fully apparent from the following detailed description set forth below when taken in conjunction with the accompanying drawings.

DETAILED DESCRIPTION OF THE PREFERRED EMBODIMENT

Figure 1:
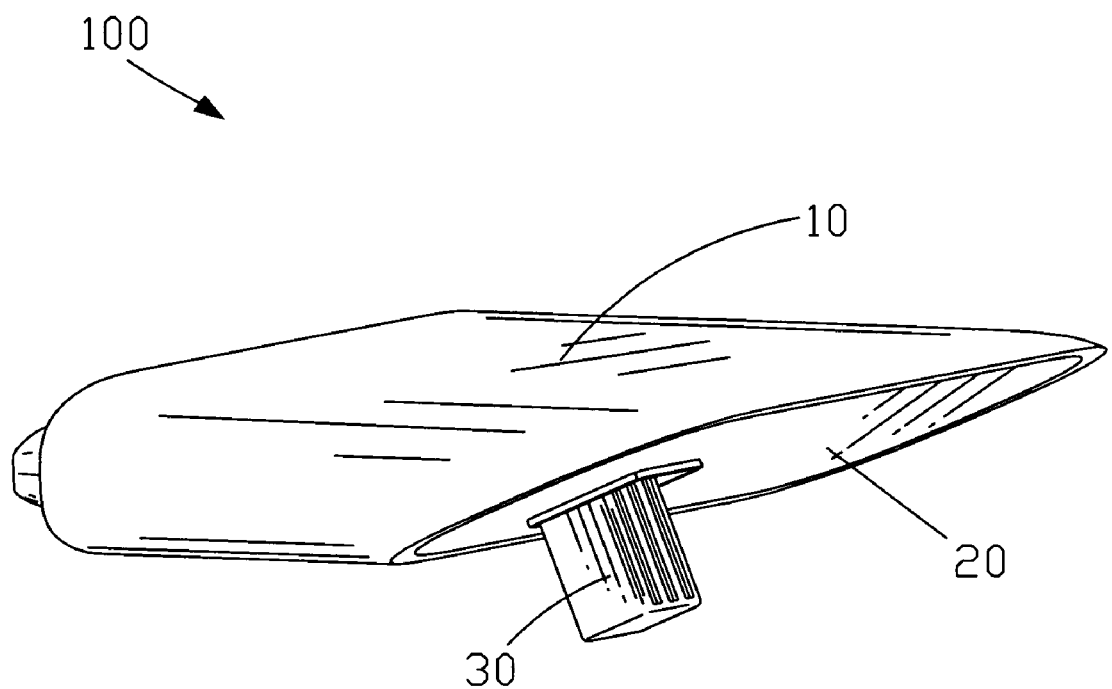
FIG. 1 is a perspective view of a battery connecting apparatus according to the present invention.
Figure 2:
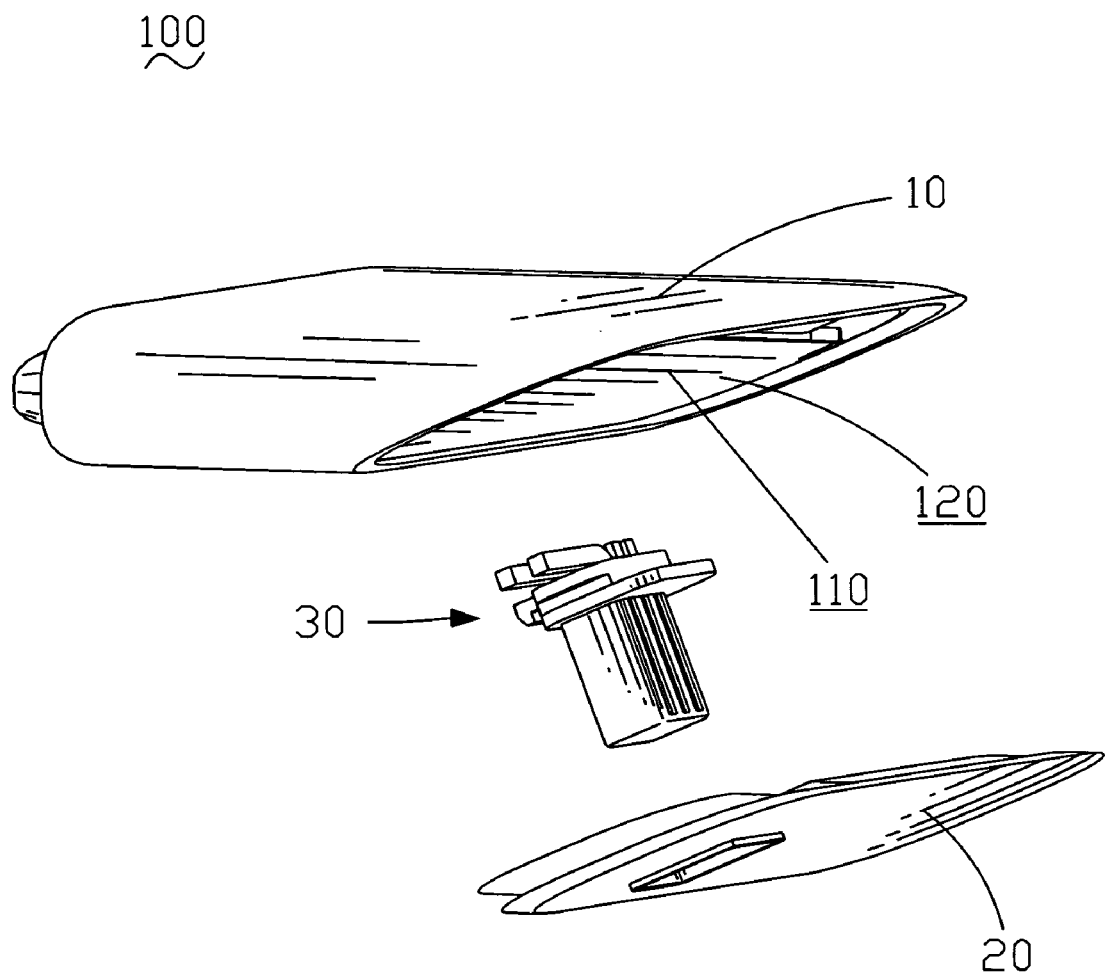
FIG. 2 is an exploded view of the battery connecting apparatus as shown in FIG. 1.

Please refer to FIG. 1 and FIG. 2. A battery connecting apparatus 100 according to the present invention is illustrated. The battery connecting apparatus 100 includes a housing 10 which has a receiving cavity 110 with an inclined opening 120 at an end thereof for receiving a battery therein, a base 20 shaped for sealing the opening 120, and a connector 30 mounted on the base 20 with a lower portion thereof extending below the base through a assembling hole 211 defined in the base 20 for connecting with a power supply circuit (not shown) of the notebook computer and an upper portion thereof supported by the base 20 for connecting with the battery (not shown).

Figure 3:
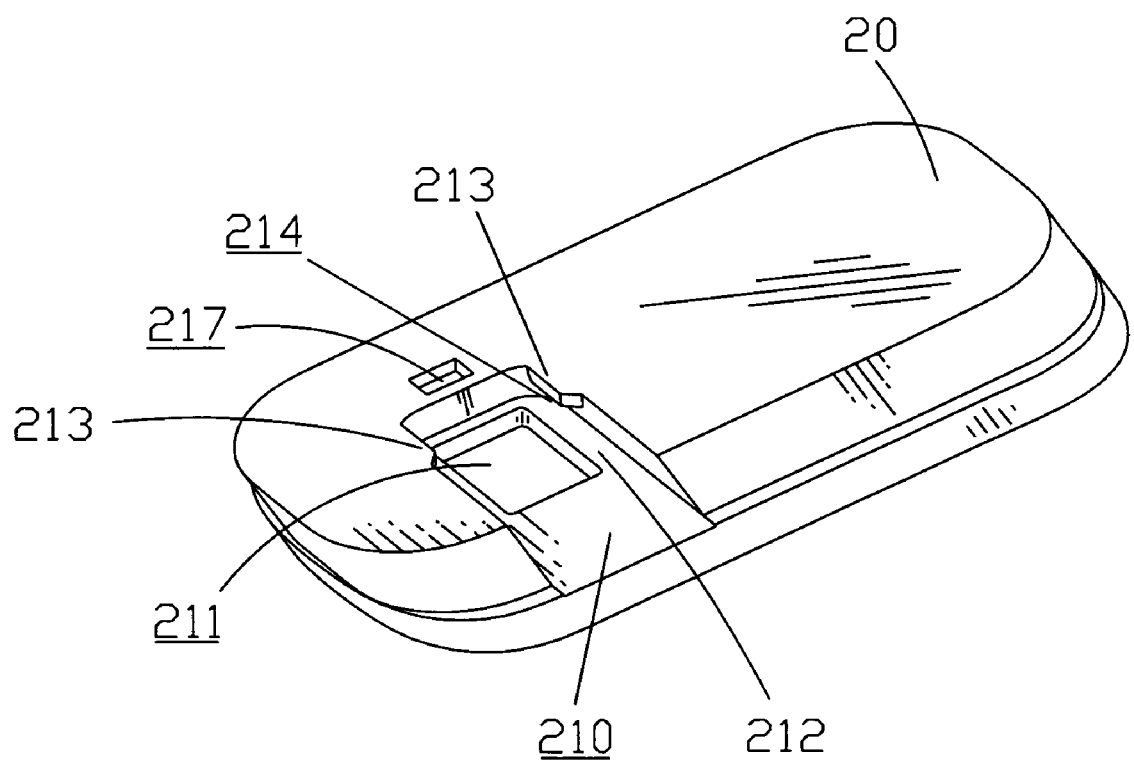
FIG. 3 is a perspective view of a base of the battery connecting apparatus shown in FIG. 2.

With reference to FIG. 3, the base 20 defines a recess 210 in a top surface thereof. The recess 210 has a bottom wall serving as a supporter 212 and two sidewalls at two opposite sides thereof. The assembling hole 211 is provided through the supporter 212 to be in communication with the recess 210. Each sidewall of the recess 210 has a portion extending into the recess 210 to form a base sliding rail 213. Accordingly, a base sliding groove 214 is defined between the base sliding rail 213 and the supporter 212. The base 20 further has a latching hole 217 which is disposed in the top surface thereof and behind the assembling hole 211.

Figure 4:
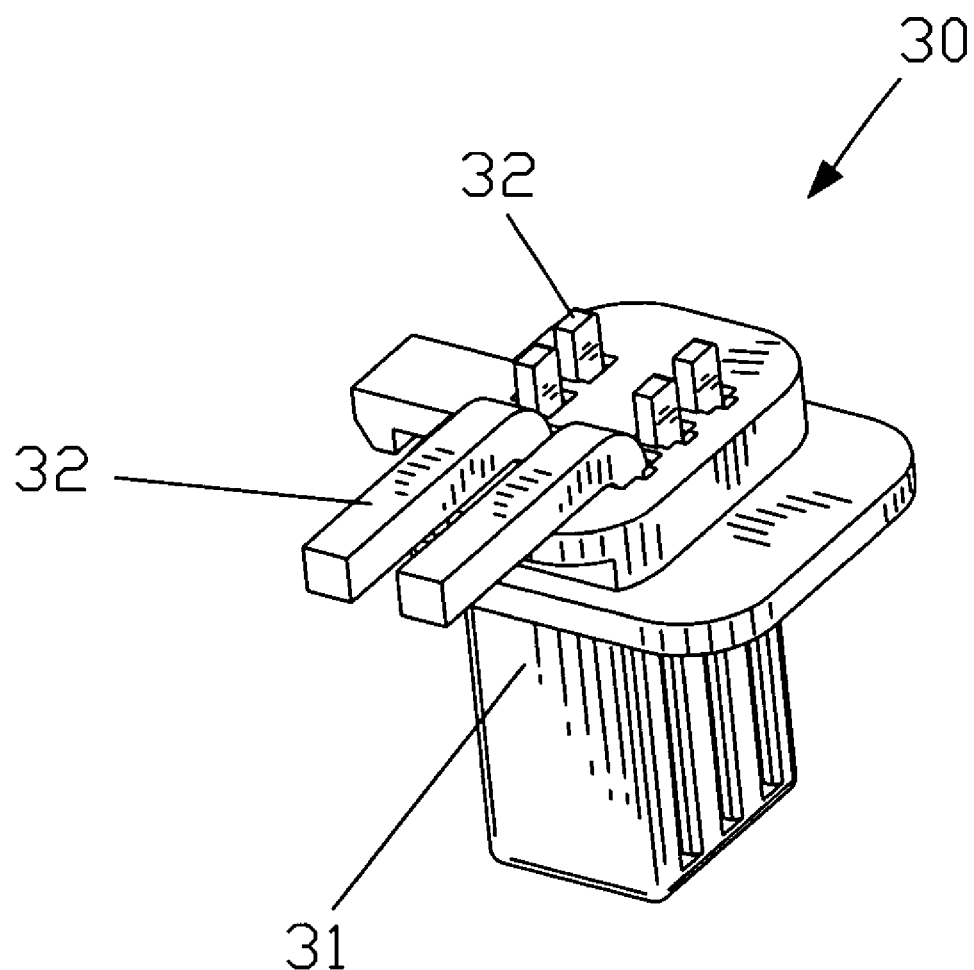
FIG. 4 is a perspective view of a connector of the battery connecting apparatus shown in FIG. 2.
Figure 5:
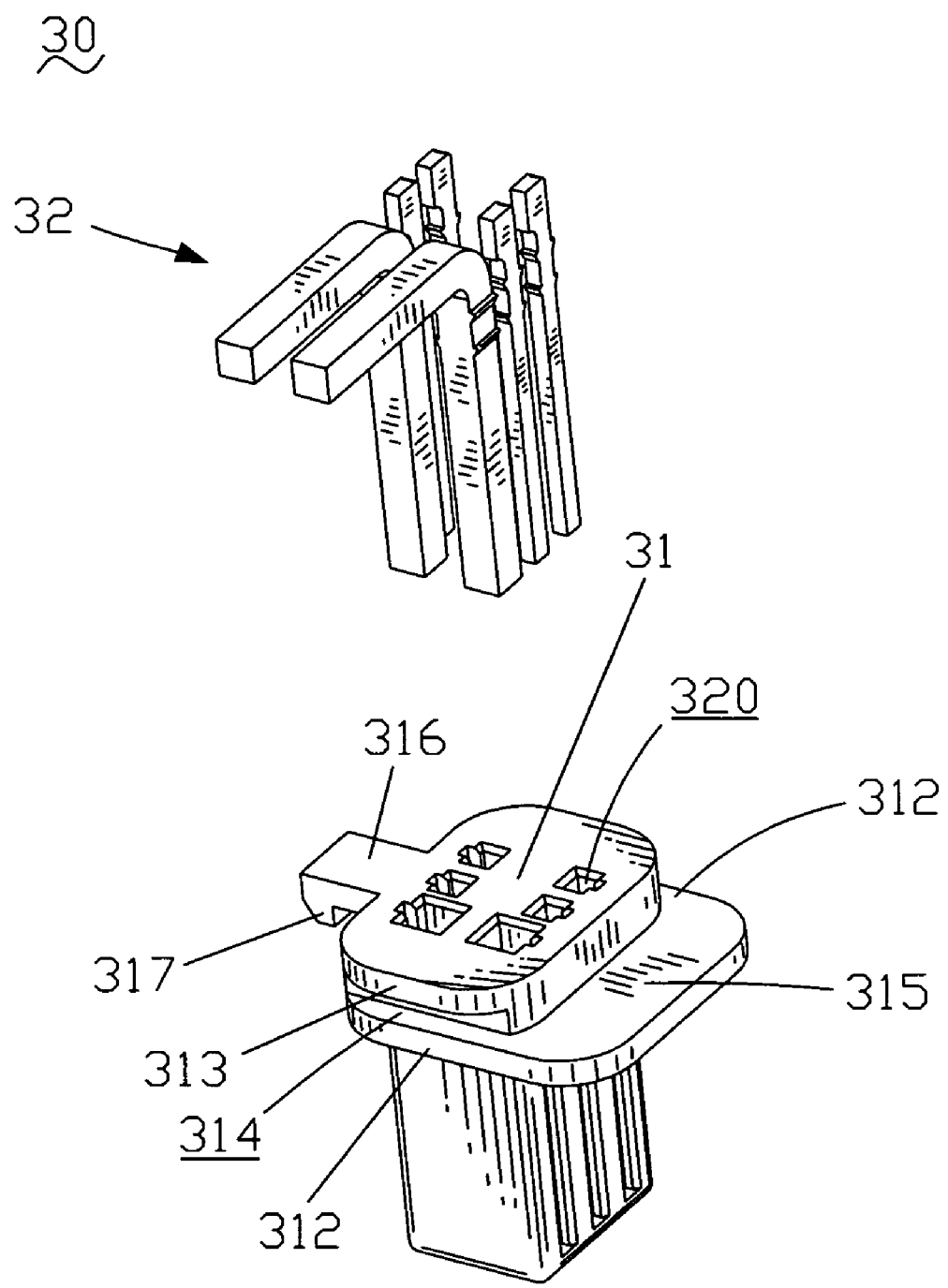
FIG. 5 is an exploded view of the connector shown in FIG. 4.
Figure 6:
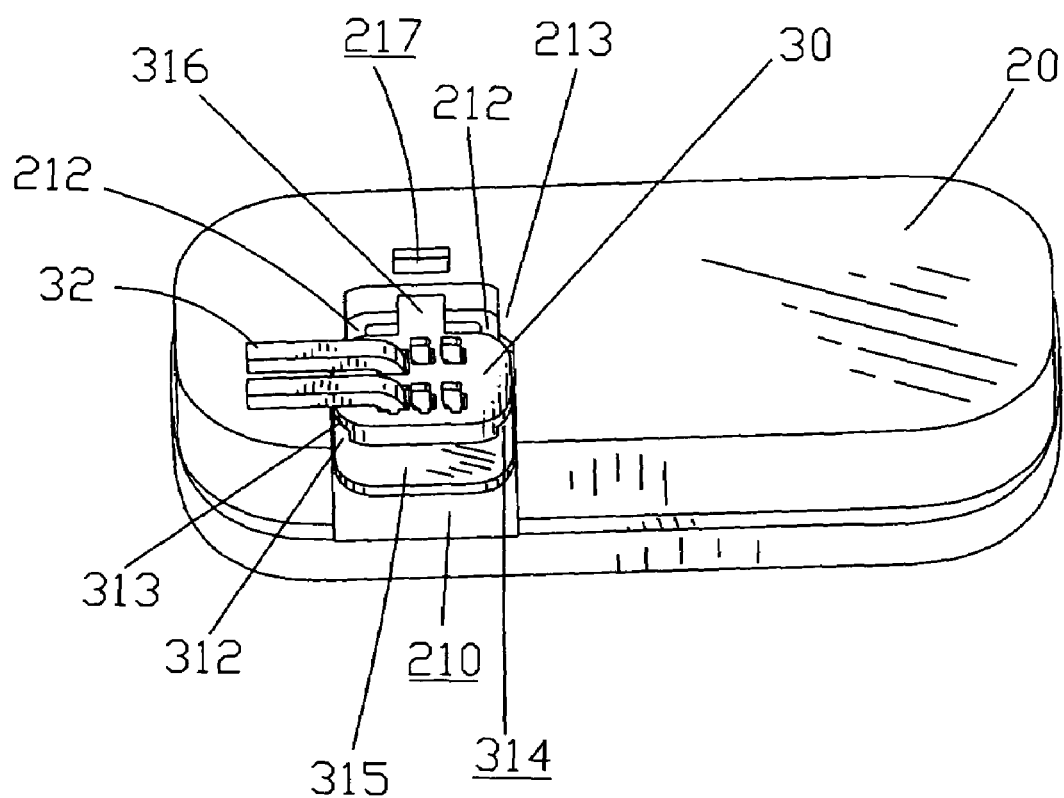
FIG. 6 is an assembled perspective view of the base and the connector in a position where the connector is in its removable position.
Figure 7:
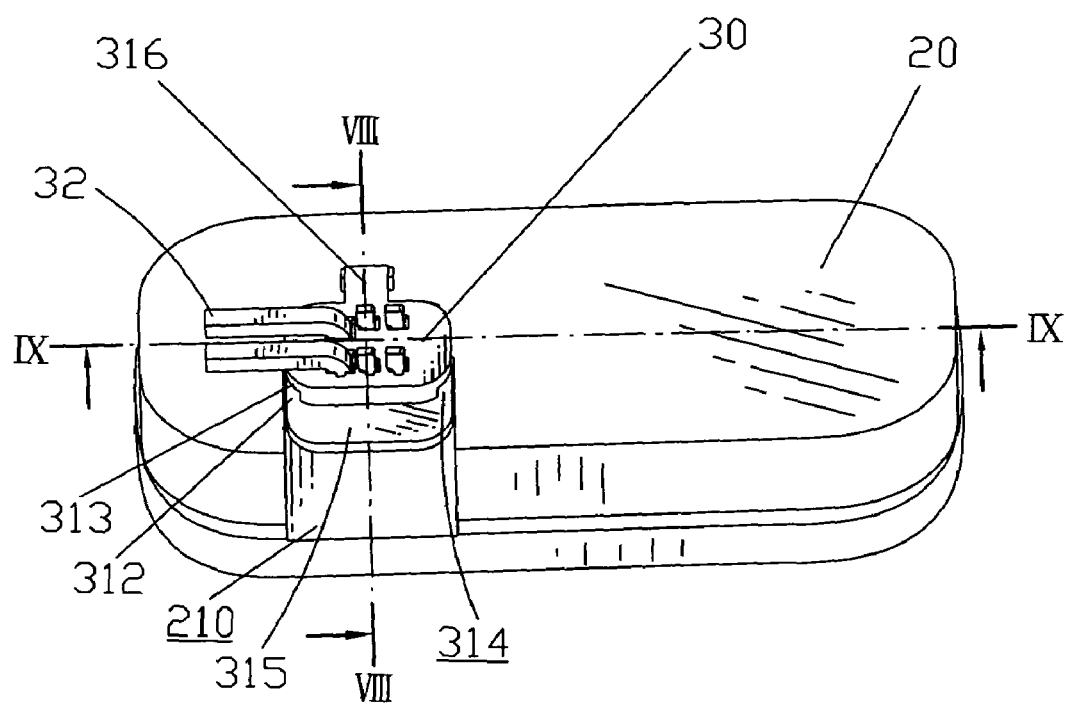
FIG. 7 is an assembled perspective view of the base and the connector in a position where the connector is in its final assembled position.
Figure 8:
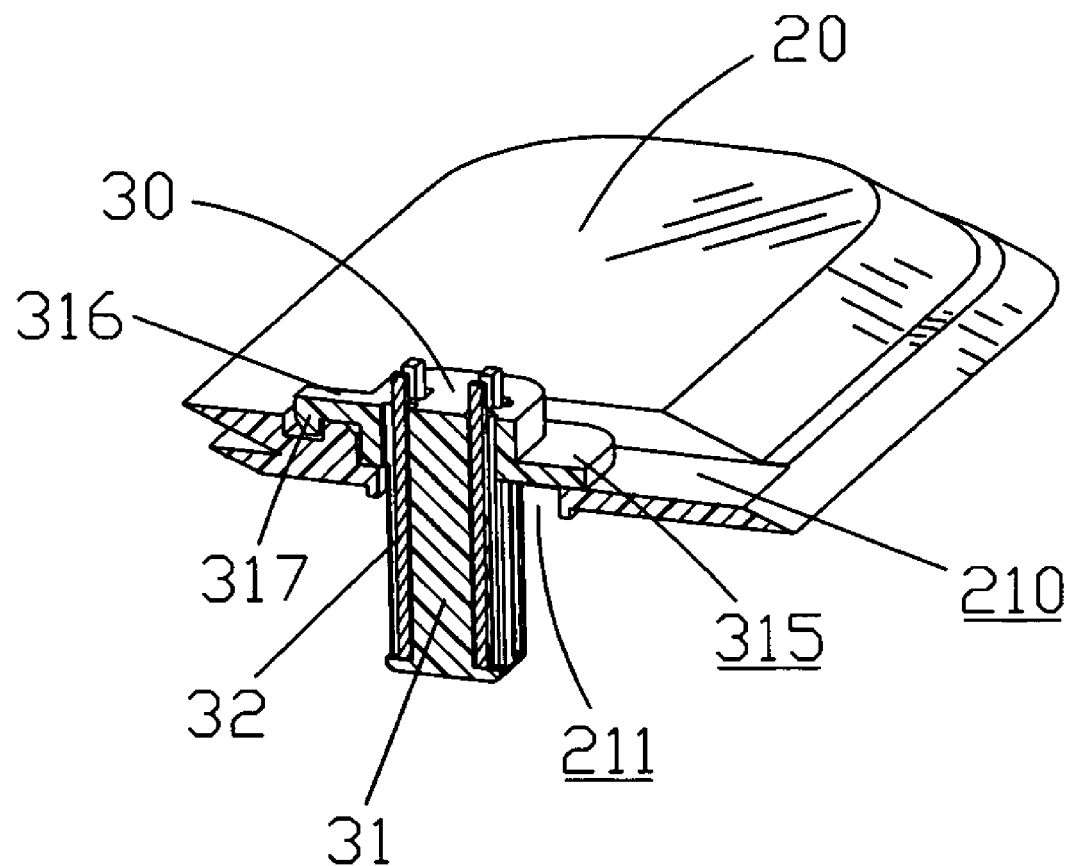
FIG. 8 is a cross-sectional view taken along the line VIII—VIII of FIG. 7.
Figure 9:
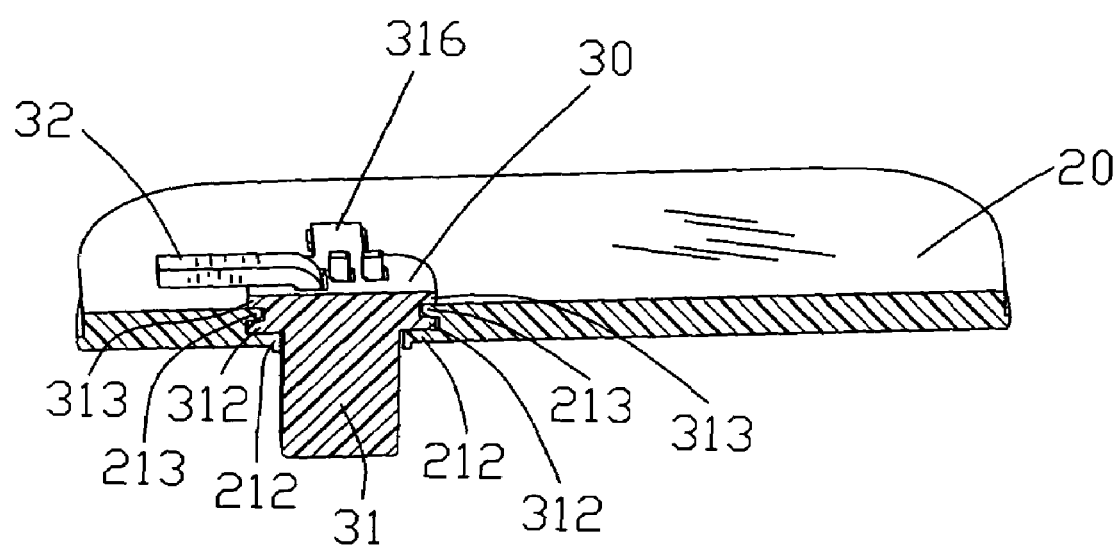
FIG. 9 is a cross-sectional view taken along the line IX—IX of FIG. 7.

Please refer to FIG. 4 and FIG. 5. The connector 30 includes an insulating body 31 and a plurality of contacts 32 disposed in the insulating body 31.

With reference to FIG. 5, a lower portion of the insulating body 31 is shaped as a tetragon prism, which can be inserted into the assembling hole 211 of the base 20 and can laterally slide in the assembling hole 211 only from front to rear. An upper portion of the insulating body 31 forms two connector sliding rails 312, which are disposed at two opposite sides of the insulating body 31 for sliding along and resting in the base sliding grooves 214. Above the two connector sliding rails 312, two retainers 313 are disposed, which are integrally formed at the two opposite sides of the insulating body 31, thereby defining two connector sliding grooves 314 between the two connector sliding rails 312 and the two retainers 313 (the right connector sliding groove not shown). The connector sliding grooves 314 are adapted to retain the base sliding rails 213 therein. A latching arm 316 is integrally formed on the rear side of the insulating body 31 and extending rearward. The latching arm 316 has a hook 317 formed at the free end thereof. The upper portion of the insulating body 31 further provides a plate 315 which is integrally formed on the front side of the insulating body 31 and laterally arranged in the same plane with the connector sliding rails 312.

With reference to FIG. 4 and FIG. 5 again, the insulating body 31 vertically defines a plurality of contact receiving holes 320 therein for respectively vertically holding the contacts 32. The upper portions of the contacts 32 are used for electrically connecting the battery, and the lower portions of the contacts 32 are used for electrically connecting the power supply circuit of the notebook computer.

With reference to FIGS. 6–9, the assembling procedure of the battery connecting apparatus 100 includes three steps. Firstly, the lower portion of the connector 30 is inserted into the assembling hole 211 of the base 20 and the two connector sliding rails 312 of the connector 30 are respectively supported on the supporter 212 of the base 20 (shown in FIG. 6) in a removable position where the connector 30 is removable from the base 20. Next, the connector 30 received in the assembling hole 211 is slid rearwards, during which the two connector sliding rails 312 of the connector 30 respectively slide along the two base sliding grooves 214, and the two base sliding rails 213 of the base 20 respectively guide the two connector sliding grooves 314 (shown in FIG. 9), until the connector 30 is latched in an assembled position where the hook 317 of the latching arm 316 is latched to the latching hole 217 (shown in FIGS. 7 and 8). Finally, the base 20 together with the connector 30 assembled thereon is inserted in the receiving cavity and seals the opening 120 of the insulating housing 10 (shown in FIG. 1).

As mentioned above, with providing a sliding engagement mechanism between the base 20 and the connector 30, the connector 30 can slide between the removable position where the connector 30 is removable from the base 20 and the assembled position where the connector 30 is assembled with the base 20. Furthermore, with providing a latching mechanism between the base 20 and the connector 30, the connector 30 can be latched in the assembled position. As can be seen, these sliding engagement mechanism and latching mechanism can certainty and effectively simplifies the assembling procedure of the battery connecting apparatus 100. According to another aspect, the connector 30 and the base 20 are connected by the sliding engagement mechanism and the latching mechanism disposed on themselves. No additional part is needed. Parts of the battery connecting apparatus 100 are thus minimized.

Although a preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. A battery connecting apparatus adapted to connect a battery to a notebook computer comprising:
a housing having a receiving cavity with an opening at an end thereof for receiving the battery therein;
a base shaped for sealing said opening of said housing, an assembling hole being defined in said base; and
a connector including an insulating body and a plurality of contacts disposed in said insulating body, said connector being mounted on said base with a lower portion thereof extending below said base through said assembling hole and an upper portion thereof supported by said base;
wherein a sliding engagement mechanism is provided between said base and said insulating body for enabling said connector to slide between a removable position where said connector is removable from said base and an assembled position where said connector is assembled with said base, the sliding engagement mechanism includes a sliding groove and a sliding rail being slidable along the sliding groove, and a latching mechanism is provided between said base and said insulating body for latching said connector in the assembled position;
wherein said base together with said connector assembled thereon is inserted in said receiving cavity and seals said opening of said housing with the upper portion of said connector received in said receiving cavity for electrically connecting said battery and the lower portion of said connector remaining at outside for connecting said notebook computer.

2. The battery connecting apparatus as claimed in claim 1, wherein the sliding groove is defined at a side of the assembling hole, and the sliding rail is disposed at a side of the insulating body.

3. The battery connecting apparatus as claimed in claim 1, wherein the sliding groove is defined at a side of the insulating body, and the sliding rail is disposed at a side of the assembling hole.

4. The battery connecting apparatus as claimed in claim 1, wherein the latching mechanism includes a latching hole defined in the base and a latching arm disposed on the connector, a free end of the latching arm forms a hook, the hook latches to the latching hole when the connector slides to the assembled position.

* * * * *